United States Patent
Paccoud et al.

(10) Patent No.: US 10,774,784 B2
(45) Date of Patent: Sep. 15, 2020

(54) STIRLING ENGINE WITH A MEMBRANE CONNECTING THE PISTON TO THE CYLINDER OF THE STIRLING ENGINE AND A METHOD OF USING THIS STIRLING ENGINE

(71) Applicant: SUN ORBIT GMBH, Hettingen (DE)

(72) Inventors: Olivier Paccoud, Breitenbach (FR); Jurgen Kleinwachter, Kandern (DE); Patrick Genkinger, Hettingen (DE)

(73) Assignee: SUN ORBIT GMBH, Hettingen (DE)

( * ) Notice: Subject to any disclaimer, the term of this patent is extended or adjusted under 35 U.S.C. 154(b) by 0 days.

(21) Appl. No.: 15/560,308

(22) PCT Filed: Mar. 23, 2016

(86) PCT No.: PCT/IB2016/000470
§ 371 (c)(1),
(2) Date: Sep. 21, 2017

(87) PCT Pub. No.: WO2016/151401
PCT Pub. Date: Sep. 29, 2016

(65) Prior Publication Data
US 2018/0252183 A1    Sep. 6, 2018

(30) Foreign Application Priority Data

Mar. 25, 2015 (DE) .......... 10 2015 003 741
Aug. 8, 2015  (DE) .......... 10 2015 010 090

(51) Int. Cl.
*F02G 1/055*    (2006.01)
*F02G 1/043*    (2006.01)
(Continued)

(52) U.S. Cl.
CPC .......... *F02G 1/055* (2013.01); *F02G 1/043* (2013.01); *F02G 1/0435* (2013.01); *F02G 1/053* (2013.01);
(Continued)

(58) Field of Classification Search
CPC .......... F02G 1/04; F02G 1/0435; F02G 1/044; F02G 1/053–057; F02G 2253/02;
(Continued)

(56) References Cited

U.S. PATENT DOCUMENTS 4,333,424 A * 6/1982 McFee .............. F02B 33/02
                                              123/39
5,337,562 A    8/1994 Kleinwaechter et al.
(Continued)

FOREIGN PATENT DOCUMENTS

DE    3015815 A1    10/1981
DE    3432912 A1 *  3/1986 ............ F02G 1/043
(Continued)

*Primary Examiner* — Laert Dounis
(74) *Attorney, Agent, or Firm* — Butler Snow LLP; Adelee E. Traylor

(57) ABSTRACT

The present invention relates to a low temperature, low frequency Stirling engine. Its special geometry allows for large heat exchanger surfaces and great regenerators in order to reach good "Carnoization" efficiency factors. Displacer and power piston may be connected with circular polymer based membrane sealings to the cylinder walls. The cold space of the Stirling Engine may cylindrically Surround the outer periphery of the working cylinder, making thermal isolation obsolete. The engine is for instance suited to operate as base power prime mover using thermal solar collectors and may be coupled with hot oil or pressurized water heat storages. In the reverse mode, the Engine works as effective Heat-Pump/Cooling Engine.

17 Claims, 8 Drawing Sheets

(51) Int. Cl.
  *F02G 1/053* (2006.01)
  *F02G 1/057* (2006.01)
  *F03G 6/06* (2006.01)

(52) U.S. Cl.
  CPC ........... *F02G 1/057* (2013.01); *F02G 1/0535* (2013.01); *F03G 6/068* (2013.01); *F02G 2243/02* (2013.01); *F02G 2243/04* (2013.01); *Y02E 10/46* (2013.01)

(58) Field of Classification Search
  CPC ............. F02G 2253/04; F02G 2253/06; F02G 2253/10; F02G 2270/30; F02G 2270/40; F02G 2270/55; F02G 2244/50–54
  See application file for complete search history.

(56) References Cited

U.S. PATENT DOCUMENTS

| | | | | |
|---|---|---|---|---|
| 5,414,997 A | * | 5/1995 | Tailer | F02G 1/0435 60/516 |
| 2011/0198887 A1 | * | 8/2011 | Rabhi | F02B 33/22 296/193.01 |
| 2012/0159943 A1 | * | 6/2012 | Steiner | F02G 1/043 60/526 |

FOREIGN PATENT DOCUMENTS

| | | | | |
|---|---|---|---|---|
| DE | 3432912 A1 | | 3/1986 | |
| DE | 10210490 A1 | * | 9/2003 | ................ F01B 7/12 |
| GB | 1581749 A | * | 12/1980 | ........... F02G 1/0435 |
| WO | 2011003207 A1 | | 1/2011 | |

\* cited by examiner

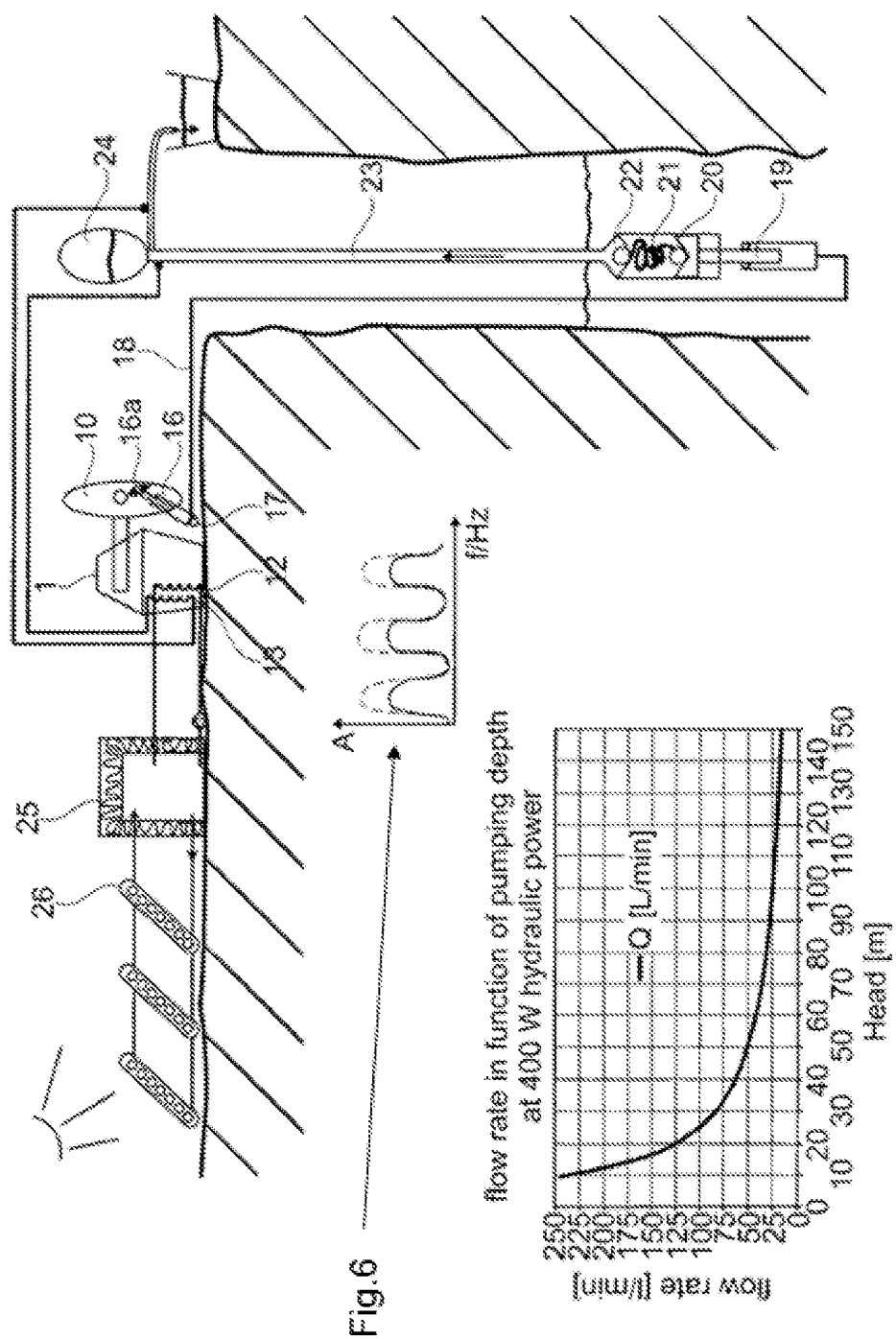

STIRLING ENGINE WITH A MEMBRANE CONNECTING THE PISTON TO THE CYLINDER OF THE STIRLING ENGINE AND A METHOD OF USING THIS STIRLING ENGINE

TECHNICAL FIELD

The present invention relates to a low temperature Stirling Engine, to specific topologies relating to this Stirling Engine including membranes and to different methods using this Stirling Engine.

BACKGROUND TO THE INVENTION

Stirling engines have been described in the art since their discovery in the early 1800's. Such closed-cycle engines function by compression and expansion of a working medium at different temperatures, either generating mechanical energy from a temperature difference or visa-versa (i.e. generate a temperature difference with mechanical energy).

In contrast to internal combustion engines, the heating and cooling of the hermetically enclosed working medium is executed through heat exchangers on the hot side and the cold side. This allows to operate the engine with practically all available heat sources.

Thermodynamically the Stirling cycle in its ideal configuration is characterized by the efficiency (ç) formula: Eta=1−Tu/To, wherein:
  $T_o$=Temperature on the hot side (K)
  $T_u$=Temperature on the cold side (K)
This is equivalent to the Carnot efficiency.

The graph of attached FIG. 7 shows the efficiencies in function of the $\Delta T$ between the hot gas and the cold gas. In order to achieve high efficiencies it is logic to think first about high temperatures on the hot side of the cycle, typically >800° C. As the graph shows that an ideal Stirling engine would in this case transform 70% of the input heat into mechanical energy. However, real high temperature engines of the state of the art are only capable, to reach 50% of this ideal value resulting in an efficiency of 35% (with other words, work with a "Carnoization factor" of 50%).

The main reason for these losses are:
  a) High working frequencies of the compact engines leading to large hydrodynamic friction losses of the working gas;
  b) Regenerator losses due to short heating and cooling periods; consequently the "heat-wave" is not completely penetrating the regenerator matrix (heating cycle) and giving back its heat content to the working gas (cooling cycle);
  c) Small heat exchanger surfaces, leading to large DT's toward the working gas (DT representing the temperature difference between the fluid in the heat exchangers and the working gas);
  d) As shown in attached FIG. 7, the ideal Stirling cycle is composed by 4 steps (moving from 1 to 2, from 2 to 3, from 3 to 4 and back from 4 to 1 in the Volume versus Pressure diagram):
  1-2: isothermal compression of the working gas;
  2-3: isochoric displacement of the gas (through the regenerator) from cool to hot;
  3-4: isothermal expansion of the working gas; and
  4-1: isochoric displacement of the gas (through the regenerator) from hot to cool.

Fast moving, compact high temperature Stirling engines as described so far cannot expand and compress the gas in good approximation to the isothermal process; this results in further losses.

SUMMARY OF THE INVENTION

To overcome one or more of the above mentioned problems the present invention is directed to a low temperature Stirling engine (inventors' working name: "SunPulse"), avoiding, by its specific construction and topology, one or more of the weaknesses of classical, high temperature Stirling engines of the prior art.

According to a main aspect of the invention, the present invention is directed to a Stirling engine comprising at least one cylinder with an expansion chamber and a compression chamber, and a power piston and a displacement piston that are located in the at least one cylinder;
  wherein the cylinder further comprises at least one regenerator connecting the expansion chamber and the compression chamber;
  wherein the cylinder comprises at least one heat exchanger, and at least one heat sink; and
  wherein a working medium is present in the expansion chamber, the compression chamber and the regenerator,
  characterized in that the engine comprises at least one membrane that connects at least one of the pistons to the at least one cylinder.

A "membrane" shall be understood as a flexible sheet, preferably a rollable sheet.

Preferably, the membrane is in the form of a circular ring shaped sheet.

By constructive easy way, at least one of the pistons could be hung up by one end of the at least one membrane being fixed in place at the least one of the pistons, and wherein an other end of the at least one membrane is fixed in place at the at least one cylinder.

Preferably, the power piston is connected to the cylinder.
Preferably, the power piston membrane is inflated.
Preferably, one end of the power piston membrane is fixed in place at the power piston and another end of the power piston membrane is fixed in place at the cylindrical housing.
Preferably, the displacer piston is connected to a cylindrical heater of the expansion chamber of the cylinder with a displacer piston membrane.
Preferably, the displacer membrane is thermally insulated.
Furthermore it is advantageous, if one end of the displacer piston membrane is fixed in place at the displacer piston and an other end of the displacer piston membrane is fixed in place at the cylindrical heater.
Preferably, the at least one membrane is polymer-based.
Preferably, the at least one membrane is a double layer membrane.
Preferably, the at least one membrane comprises halogenated olefin based polymer material.
Preferably, the heat exchanger is located adjacent to the regenerator on the side facing the expansion chamber and the heat sink is located adjacent to the regenerator on the side facing the compression chamber.
Preferably, the compression chamber at least in part surrounds cylindrically the expansion chamber of the working cylinder. As a consequence, thermal isolation becomes obsolete.
Preferably, the compression chamber at least in part surrounds cylindrically the regenerator. As a consequence, thermal isolation of the regenerator becomes obsolete.

Advantageously, at least one polymer-based membrane is connected to at least one of the pistons and to the cylinder, wherein the connection is gastight. Then, the gas always has to pass the regenerator to flow from the expansion chamber into the compression chamber or vice versa.

With regard to an especially preferred embodiment of the invention it is advantageous if the engine is connected to a flywheel that is connected to a first hydraulic water piston.

Preferably, the engine is placed in an airtight cover that is pressurized higher than 1.5 and up to 5 bar.

Furthermore, it is advantageous, if the engine further comprising an axis that is connected to a flywheel, wherein the airtight cover has rotational bearings around the axis.

Preferably, the diameter of the at least one power piston is at least 10 times larger than the vertical displacement of the power piston.

In another aspect of the invention, the invention is direct to a method of using a Stirling engine, wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that at least one polymer-based membrane is connected to at least one of the pistons and to the cylinder and wherein the connection is gastight.

Preferably, the power piston is connected to the cylinder with a power piston membrane that is double layer, polymer based and inflated and wherein the displacer piston is connected to the expansion chamber of the cylinder with a displacer piston membrane that is thermally insulated.

In another embodiment, the invention is direct to the use of a membrane to connect a piston to a cylinder of a Stirling machine, wherein the membrane is a polymer-based multiple-layered membrane that is gas inflated and wherein the connection is gastight.

In another embodiment, the invention is direct to a Stirling engine comprising at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that the engine is connected to a flywheel that is connected to a first hydraulic water piston.

In another embodiment, the invention is direct to a method of using a Stirling engine, wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that the engine is connected to a flywheel that drives a first hydraulic water piston.

The innovative first hydraulic pump in combination with the present low frequency Stirling engine according to these two embodiments represents an important progress toward established solar pumping devices, especially compared to photovoltaic pumps in connection with fast rotating electrical borehole pumps.

The efficiency of slowly working (-water) hydraulic pumps, directly connected to a flywheel with high torque is much better than the efficiency of the electric pump.

If the system needs to be operated during night-time, which is of particular interest for water economy in hot climates, then the thermal storage (25) is by far more economic than an electric battery storage needed by the PV-system.

Furthermore, the Stirling hydraulic system does not contain rare and/or hazardous materials as it is the case for the PV system.

Another important advantage of the Stirling-water hydraulic pumping system compared to the state of the arts is its possibility to adjust the pump exactly in function of the depth of the borehole.

In another embodiment, the invention is direct to a Stirling engine comprising at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that the engine is connected to a flywheel that has an excenter pin that is positioned between the center of rotation of the flywheel and its periphery.

Preferably, the excenter pin is positioned in a slot along the diameter of the flywheel.

In another embodiment, the invention is direct to a method of using a Stirling engine wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that the engine is connected to a flywheel with an excenter pin wherein the excenter pin driving the displacer piston rod is connected to the flywheel such that the excenter pin can be continuously shifted in a slot between the center of rotation to the periphery of the related gear wheel along the flywheel diameter, in order to regulate the engine power.

In another embodiment, the invention is direct to a method of using at least two stirling engines, wherein the at least two engines are coupled such that at least one engine functions as thermal prime mover and drives the second, operating inversely as cooling engine or heat pump.

Preferably, the reversibly operating Stirling is driven by external energy.

Preferably, the external energy source is a photovoltaic panel and the Stirling engine cooler produces ice for storage.

Preferably, the prime mover acts as tri-generation system for electricity, heating and cooling in combination with solar thermal collectors and adequate heat storages.

Preferably, the low speed, high torque output of the flywheel is directly mechanically connected to different subsystems selected from compressor, mills, saws, conveyor belts and mixtures thereof.

In another embodiment, the invention is direct to a Stirling engine comprising at least one cylinder with an expansion chamber and a compression chamber, and a power piston and a displacement piston that are located in the at least one cylinder;

wherein the cylinder further comprises at least one regenerator connecting the expansion chamber and a compression chamber;

wherein the cylinder comprises at least one heat exchanger, and at least one heat sink; and wherein a working medium is present in the expansion chamber, the compression chamber and the regenerator, characterized in that the engine is placed in an airtight cover that is pressurized higher than 1.5 and up 5 bar.

Preferably, the Stirling engine further comprising an axis that is connected to a flywheel, wherein the cover has rotational bearings around the axes.

In another embodiment, the invention is direct to a method of using a Stirling engine, wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that at least the engine is placed in an airtight cover and operates at an increased pressure of higher than 1 and up 5 bar.

Preferably, the frequency of the piston movement is higher than 1.5 and lower than 5 Hz.

In another embodiment, the invention is direct to a method of using a Stirling engine, wherein the engine comprises at least one cylinder with at least one regenerator that connects an expansion chamber with a heat exchanger and a compression chamber with a heat sink, wherein a power and a displacement piston move inside the at least one cylinder moving a working medium through the at least one regenerator between the expansion chamber and the compression chamber, wherein the at least one heat exchanger heats the working medium in the expansion chamber, and wherein the at least one heat sink cools the working medium in the compression chamber, characterized in that diameter of the at least one power piston is at least 5 times larger than the vertical displacement of the power piston.

Preferably, the frequency of the vertical movement of the power piston is from 1 to 5 Hz over a period of at least 1 minute. Preferably, the ratio of the diameter of the power piston to the (maximum) vertical movement of the piston (during operation of the low temperature Stirling engine) is at least 1:5, and preferably up to 1:100, more preferably up to 1:50, most preferably up to 1:15.

The present invention is presented with various embodiments, as generally discussed above.

Each embodiment is described independently of the other embodiments but it will be understood that the features of each embodiment can used or introduced in other embodiments.

This independently applies to each of the features of the preamble of each embodiment.

Most importantly, this applies independently to the characterizing features of each embodiment.

As can be seen from the efficiency/temperature graph (FIG. 7), the low temperature Stirling engine of the invention has, for the reasons mentioned in the following, a higher "Carnoization" factor.

It has been found that it is preferably limited to a maximum operation temperature of 300° C. due to the material parameters of the utilized membrane according to the invention.

The present low temperature engine (temperature on the hot side preferably situated between 80 and maximum 300° C.) is preferably characterized by one or more of the following parameters:

a) Low working frequencies (1-5 Hz in comparison to typical 300-100 Hz for high temperature engines). Therefore much lower displacement energy (shifting the working medium between hot and cold side of the Stirling cycle)—higher neto power output;

b) Higher regenerator efficiency due to longer contact time of working medium to regenerator matrix;

c) Large heat exchanger surface versus working medium volume—lower $\Delta T$—higher efficiency;

d) better approximation to isothermal expansion and compression resulting from good ratio "heat exchanger surface versus working medium volume" and lower speed of working medium.

All these positive effects make it possible to realize low temperature Stirling engine which can achieve good efficiencies at low temperatures (see efficiency/temperature Graph).

It has been found that to reach these positive effects in view of the low energy density of the low temperature Stirling engine—this preferably requires large dimensions.

Preferably, large dimensions include large diameters of the working and displacer pistons.

They are preferably closely sealed towards the cylinder walls.

This can be achieved by classical piston rings; however they require perfect (round) shapes of the corresponding cylinder and a high smoothness of the cylinder walls.

Accomplishing this task by using cylinders of great diameters as preferred for the present invention is often prohibitively expensive. Therefore we developed preferred membrane bearings according to one aspect of the invention which proved perfectly fulfilling the task.

They are preferably used for a temperature range suitable to the utilized polymer membrane materials.

As a preferred example, membranes using fluoropolymer compounds can operate within the temperature interval of −100 to +280° C.

Therefore the highest possible heater temperature of the present Stirling engine is currently around 280° C. up to 300° C.; for the same reason, its lowest achievable cold side temperature (for instance in case the Stirling is in reversible way operated as cooling engine) is −100° C.

The usage of membranes, as more detailed described below bears also following extra advantages: extreme long life time, less friction losses than piston rings and, as mentioned, the possibility to use cylinders with high tolerances concerning their roundness and surface smoothness.

This allows the economic production in small and medium sized companies without the need to use extremely high tech mass fabrication tools.

Beside all other possible heat sources, the present Stirling engine is perfectly adapted to be operated with solar heat and—for the none sunshine hours—with solar thermal heat storages.

In the simplest case, stationary solar collectors using vacuum tubes achieve 150° C. process heat (pressureless with thermal oil or under the slight pressure of 5 bars using water) at 50% efficiency. This heat can be effectively and economically stored overnight or for several day operation of the Stirling engine in, well insulated storage tanks. By this way, energy autonomy can be realized—especially in small scale applications as villages and farms in sunny countries.

If the low temperature Stirling engine is operated between the temperature interval of 150° C. (hot side) and 40° C. (cold side) it develops a mechanical efficiency of approximately 13% and the rejected heat can be used for domestic heat purposes (cogeneration).

To reach the highest possible input temperature of 280° C., simple linear through solar collectors, working with approximately 65% efficiency, can be used.

Running a low temperature Stirling engine between 280° C. (hot side) and 40° C. (cold side) will result in a mechanical efficiency of approximately 22% with the rest again as usable heat.

Generally, the invention relates to a low temperature, low frequency Stirling Engine.

Its special geometry allows for large heat exchanger surfaces and great regenerators in order to reach good "Carnoization" factors.

Displacer and power piston are connected with, preferably circular, preferably polymer-based membrane sealings to the cylinder walls.

The cold space, especially the compression chamber, of the Stirling Engine surrounds cylindrically the outer periphery, especially the expansion chamber, of the working cylinder, so that thermal isolation becomes obsolete.

The engine is specifically suited to operate as base power prime mover using thermal solar collectors and coupled hot oil or pressurized water heat storages.

In the reverse mode, the Engine works as effective Heat-Pump/Cooling Engine.

DETAILED DESCRIPTION OF THE INVENTION

The present invention relates to Stirling engines. Preferably, these Stirling engines function at low temperatures, preferably from −100° C. to 300° C.

The Stirling engine according to one embodiment of the present invention comprises at least one membrane.

Preferably, the at least one membrane of the invention connects a piston and the wall of a cylinder.

The connection between the piston and the cylinder wall is preferably made gastight by using the membrane.

Such gastight connection is preferably obtained by attaching the membrane to the piston and to the cylinder using bolts.

Preferably, the membrane is made of gastight material.

Preferably, the membrane is a multiple-layered membrane, preferably a double membrane.

Each membrane of the multiple-layered membrane is preferably a sheet.

The use of multiple-layered (at least two and preferably two) membrane for the power piston is preferred. It allows the membrane to be inflated between the multiple layers of the membrane.

Preferably, the membrane (of the power piston and/or of the displacer piston) comprises polymer material.

It has been found that the polymer material preferably has good tensile strength, good elongation strength and/or a low friction coefficient.

We have found these materials to be preferred as they are not affected by the specific operating conditions of the present invention.

Preferably, the membrane comprises polymer material in at least one sheet, preferably a double layer. and may further comprise polymer material in the fiber form.

Preferably, the polymer material comprises one or more polymers and co-polymers based on monomers selected from the group consisting of unsaturated hydrocarbons, unsaturated fluorinated hydrocarbons, unsaturated fluorochlorinated hydrocarbons, ether group-bearing unsaturated fluorinated hydrocarbons, as well as copolymers of such monomers.

Polymers prepared ether or ester links between monomers may also be suitable for use in the membrane of the present invention, for example polyurethanes.

Preferred monomers are polyolefins.

Preferred unsaturated hydrocarbons are ethylene and propylene.

Preferred monomers are ethylene, propylene, fluorinated ethylene and fluorinated propylene and mixtures thereof.

Preferred polyolefin based material is fluorinated and preferably comprises monomers that are addition products of mono, di, tri and/or tetra fluorinated monomer.

More preferably, fluorinated monomers are selected from the group consisting of tetrafluoroethylene, chlorotrifluoroethylene, hexafluoropropylene, perfluoro (alkyl vinyl ether), vinylidene fluoride, and vinyl fluoride. The polyolefin based material may also comprise non-fluorinated monomers that are not addition products (i.e. regular ethylene or propylene with hydrogen and no fluorinated or ether group).

Molar ratios of fluorinated and regular monomers are preferably between 40:60 and 60:40.

Preferably, the polymer material is selected from the group consisting of PP (polypropylene), PE (polyethylene), PFA (perfluoroalkoxy; for example tradename Teflon PFA), ETFE (ethylene-tetrafluoroethylene; for example tradenames Tefzel, Fluon, Neoflon and Texlon), EFEP (ethylene-tetrafluoroethylene-hexafluoropropylene), FEP (tetrafluoroethylene-hexafluoropropylene; for example tradenames Teflon FEP, Neoflon FEP and Dyneon FEP), PTFE (polytetrafluoroethylene; for example tradename Teflon), ECTFE (ethylene-chlorotrifluoroethylene; for example tradename Halar), PCTFE (polychlorotrifluoroethylene; for example tradenames Neoflon PCTFE, Aclon and Kel-F), mixtures thereof and copolymer of the monomers thereof.

Preferred examples of fluorinated polyolefin based material are PTFE, FEP, PFA and/or mixtures thereof.

PTFE is a particularly preferred polyolefin based material.

Preferably, the power piston membrane is fiber reinforced. It has been found that such a fiber reinforced material strengthens the power piston membrane, for instance prevents deformation and other deformations and irregularities during operation of the Stirling engine. These fibers are preferably selected from high tensile strength fibers.

Preferably, fibers are selected from natural fibers, metal fibers, fiber glass, aramid (such as Kevlar, Twaron or Technora), carbon, polyester (such as PET or PEN), UHMW-PE (such as Dyneema, Spectra or Certran), liquid crystal polymer (such as Vectran), poly-(p-phenylene-2,6-benzobisoxazole) (such as Zylon) fibers and mixtures thereof.

Preferably, the fiber is selected from a knitted fabric, woven fabric, meandered fabric, loose pieces of fiber dispersed randomly or directionally throughout the film and mixtures thereof.

Preferably, the power piston membrane comprises at least one polymer-based membrane sheet.

Preferably, the power piston membrane is a multiple-layered membrane sheet, most preferably a double membrane. The use of a membrane with multiple layers (at least two and preferably two) for the power piston is preferred. This allows the membrane to be inflated between the multiple layers of the membrane.

Preferably, a gas is used as inflation medium of the membrane.

In a preferred embodiment, the inflation medium is the working medium.

In another embodiment, the inflation medium may be another gas for instance selected from air, carbon dioxide, Nitrogen, Xenon, Krypton, Argon, Helium and/or mixtures thereof.

Preferably, the membrane is gastight connected to the side of the piston head and to the wall of the cylinder.

Such gastight connection is preferably obtained using bolts.

Preferably, the power and displacer pistons have a circular diameter.

The membrane of the invention is preferably provided around the piston and provides a gastight connection around the piston head between the piston and with the surrounding cylinder wall.

While not necessary, the displacer piston membrane may also be inflated.

Preferably, the displacer piston membrane is also a double membrane.

Preferably, the heat exchange from one to the other side is limited by use of an insulating material in the displacer piston membrane. Insulation can be achieved by selecting the right polymer material for the membrane.

As alternative a second membrane may be used and the double membrane can be inflated with an insulating gas such as Krypton or Xenon.

Also, insulating material, such as wool or insulating polymer material may be used. Of course, these measures can be combined.

The Stirling engine of the embodiment on the hydraulic water piston preferably has a connecting of the first to a second hydraulic water piston.

Preferably, pressure fluctuations produced by the first hydraulic water piston drive the second hydraulic water piston. This second hydraulic water piston is preferably submersible.

Preferably, it pumps water by a device that is formed of two one way valves, a return spring. Subsequently, the water is pumped through a raiser pipe and an air/water pressure homogenizer. An important advantage of the hydraulic pump embodiment is its possibility of adjusting the pump exactly in function of the depth of the borehole.

The Stirling engine of the embodiment with the flywheel that has an excenter pin offers benefits in power regulation of Stirling engines generally.

The pin can be moved and positioned and optionally fastened through a space (for instance a slot or rail) in the flywheel aligned with the diameter of the flywheel, positioned between the center of rotation of the flywheel and its periphery.

In a preferred aspect, the pin moves continuously during the cycle of the Stirling engine.

The Stirling engine according to the various embodiments of the present invention preferably comprises one or more of the following elements a power piston, displacer piston, at least one cylinder, regenerator, heat exchanger (hot), a heat sink (cold), working medium and crank mechanism.

The Stirling engine may comprise one or more connecting rods.

Preferably, the Stirling engine comprises a flywheel.

Even though generically referred to as cylinder, it should be understood that the cylinder does not have to be in cylindrical form.

However, the round shape of the cylindrical housing (1) has several advantages: it allows the utilization of equally round, ring like membranes (7, 4); this geometry prevents folds of these membranes which would appear if their shape would contain edges; consequently, the life time of round membranes is higher.

The inflation of the power piston membrane (7) prevents the membrane from "flapping" due to permanent pressure changes between the working medium room (2) and the ambient air.

Preferably, the membrane of the invention does not flap and remains straight (i.e. showing less than 45° C. bending of the membrane during a cycle).

Preferably, the pistons (both power and displacer) have a circular diameter that matches the cylinder, although other shapes could also be accommodated.

Preferably, the surface is conically curved to support pressure build-up in the chamber of the cylinder.

Both pistons preferably have reciprocating action, moving in and out of a cylinder.

Preferably, the Stirling engine comprises at least one cylinder, preferably 2 cylinders.

The at least one cylinder includes an expansion chamber (hot) and a compression chamber (cold).

One cylinder may be used both as an expansion chamber for the displacer piston and a compression chamber for the power piston.

The regenerator is a connection (channel) between the compression chamber and the expansion chamber.

The regenerator allows a working medium to flow between the two chambers.

Generally, the regenerator distinguishes the Stirling engine from other hot air engines.

Typically, the regenerator comprises steel wool to provide for a large surface area for absorbing or releasing heat to the working medium that passes by.

The Stirling engine of the invention uses a working medium, preferably air.

The working medium moves between the expansion and compression chambers. The heat exchanger in the expansion chamber heats the working medium and the heat sink in the compression chamber cools the working medium.

Preferably, the power piston moves inside the cylinder with the compression chamber.

Preferably, the heat exchanger is located adjacent to the regenerator, preferably in the wall of the regenerator.

Preferably, the heat exchanger faces the expansion chamber allowing heating up of the working medium.

Heat exchanger preferably includes tubing with a hot flow (of oil or water), optionally in combination with fins which can help with the flow pattern of the working fluid.

Preferably, the displacer piston moves inside the cylinder with the expansion chamber.

Preferably, the heat sink is located in the wall of the regenerator facing the compression chamber.

The heat sink preferably includes tubing with a cold flow (of water), optionally in combination with fins which can help with the flow pattern of the working fluid.

Preferably, the Stirling engine of the invention comprises thermal insulation between the expansion and the compression chamber. As % of the outer surface of the Stirling engine in contact with the two chambers, the compression chamber preferably occupies a larger part of the outer surface of the Stirling engine than the expansion chamber.

Preferably, the Stirling engine of the invention is an enclosed system.

Preferably, the Stirling engine of the invention is gastight.

Preferably, the Stirling engine of the invention is thermodynamically stable.

Preferably, the Stirling engine of the invention allows for pressure, volume and temperature changes.

The Stirling engine of the various embodiments preferably comprises a crank mechanism.

Preferably, the Stirling engine of the various embodiments comprises a flywheel.

The present invention further relates to a method of using the Stirling engine in various embodiments.

Preferably, the Stirling engine of the invention in the various embodiments has a small stroke distance, a relatively low stroke frequency, yet produces high power levels.

In a preferred embodiment, the method of the present invention is directed to the use of the stirling engine of this invention at a low piston stroke frequency of at most 10 Hz (in $s^{-1}$), more preferably at most 6 Hz, and preferably at least 0.5 Hz, more preferably at least 1 Hz, most preferably at least 2 Hz (of course this frequency is the steady state and is maintained for a considerable period of at least 1 minute and more likely 2 hours or preferably for a long time, for instance up to 24 hours or even longer).

It has been found that the use of low stroke frequency in the Stirling engine of the present invention surprisingly reduces engine energy usage, leading to high efficiency and durability.

Preferably, the methods of the present invention allow for the usage of the Stirling engine at a low temperature compared to Stirling engines previously described in the art. The efficiency of the Stirling engine is maintained or even higher. The ability to function at lower temperatures is favorably and for instance allows the application of pressurized hot water for the heat exchanger. According to the invention, the preferred temperature in the coolant of the compression chamber is at least −100° C. and preferably at most 100° C.

According to the invention, the preferred temperature for the heat exchange medium for the expansion chamber is at least 80° C. and preferably at most 300° C., more preferably at most 280° C. and most preferably at most 250° C.

According to the invention, the preferred temperature difference between the coolant and the heat exchange medium is preferably at least 80° C. and preferably at most 200° C.

A preferred heat exchange medium is water and preferably at higher pressure, and preferred ranges are for instance between 150 and 200° C. at between 2 to 6 bar, for instance 5 bar.

A preferred coolant is water, for instance at a temperature of between 0 to 25° C. Another preferred coolant is liquefied carbon dioxide for instance in a temperature of around −90° C.

In a preferred embodiment, the power piston diameter has a ratio to the stroke distance of at least 5:1, more preferably at least 10:1 and preferably at most 100:1, more preferably at most 50:1.

Stroke distance is sometimes called the amplitude.

These ratios reflect that the size of the power piston is much larger than found in the art while the stroke distance of the power piston is much shorter than found in the art. This allows for the surprising benefits of the Stirling engines of the present invention that offer high efficiency at low temperature.

Preferably, the piston stroke is at most 10 Hz and at least 0.5 Hz.

Preferably, the coolant of the heat sink of the compression chamber is at least −100° C. and at most 100° C. and the heat exchange medium for the heat exchanger of the expansion chamber is at least 80° C. and preferably at most 300° C., more preferably at most 250° C.

Preferably, the piston diameter has a ratio to the stroke distance of at least 5:1 and at most 100:1.

Further advantages of the present invention include the option of using a small piston stroke (small amplitude), a low piston stroke (low frequency) and/or a low temperature, yet maintaining high efficiency. Each of these features separately or combined offers advantages over the prior art. For instance, this allows use of materials that are easier to handle and last a longer time. Also, the Stirling engine according to the invention allows for collection and storage of sun energy that is sufficient to cover 24 hrs of usage for at least 14 days.

Another important feature of the present invention is the reverse operation of the low temperature Stirling engine as heat pump or cooling engine. By definition, Stirling cooling or heat pump cycles have a better performance than the usual compressors using cooling medias with negative climatic effects if delivered to the atmosphere.

Furthermore, the classical compression coolers loose a lot of energy through the inherent necessary throttle. In contrast, Stirling engines operated in reversible way don't need this throttle, because their cooling media is gas, without phase changing.

Furthermore, the better their "Carnoization" factor is, the more their COP approaches the thermodynamically possible value. The classical Stirlings are well known as best systems to create in one step temperatures approaching the absolute zero (cryocoolers). If one ask why they are not used to generate moderate cooling temperatures for air conditioning or ice production, the answer is the lacking heat exchanger surface of the classical, compact, fast operating Stirling engines.

All the arguments summarized for the large exchanger surface, low frequency prime mover, hold also true for the reversible heat-pump, cooling engine. They are ideally suited for air conditioning, ice production, cold stores freezing out $CO_2$ of the atmosphere and other tasks down to temperature levels of −100° C. (limit of membrane materials, as previously mentioned).

Two classes of this coolers, heat-pumps are realizable:

1). The low temperature Stirling engine—low temperature Stirling engine ("SunPulse-SunPulse") configurations in which one thermally driven low temperature Stirling prime mover provides the mechanical energy to run in reversible way the low temperature Stirling cooler/heat-pump. An interesting version of this type is a house based air condition system in which, similar to the water pump assembly of FIG. 2, solar thermal collectors provide heat energy to a heat storage, which in turn, allows the low temperature Stirling prime mover to operate the low temperature Stirling cooler/heat-pump around the clock.

2). The external energy low temperature Stirling engine configurations. A typical example for this class of systems is the combination of a photovoltaic panel with a low temperature Stirling engine cooler. During sunshine the PV panel produces via an electric motor the energy to run the low temperature Stirling engine cooler. If, for example, water at 20° C. is available as a storage medium, this medium can be frozen down to ice with a COP of 5. This means that the input of 100 Wt PV electricity generates approx. 500 Wt of freezing power. The ice serves as storage for 24 h cooling.

Bringing down the operational temperature of powerful Stirling engines as described in the present invention, bears a full scope of innovative solutions. One important of them is a solar cogeneration system using (roof mounted) thermal collectors to run day and night (with heat storage) a low temperature Stirling engine producing the electricity and heat demand of the building (and by adding the mentioned low temperature Stirling engine—low temperature Stirling engine air conditioning system, even Tri-generation system: electricity, heating, cooling.

The more this systems are situated in southern latitudes with frequent sunshine, the more they can be operated only by solar energy.

For regions with longer bad weather periods, the solar energy can be complemented by "Bio-mass" (typically bio-gas or effective burners of biomass) or by reversible, thermochemical storages. In both cases, the required low temperature level is a big advantage; for "bio-mass" burners, no mineralization of smoke particles, destroying the heat-exchanger capacity, occurs. In the case of reversible thermochemical storages, attractive system like zeolite water or MgH2 become technically feasible.

Seen as a prime mover to produce local, small scale energy autonomy, the low temperature Stirling engine has a further advantage: many systems like air compressors, saws, (Corn-) mills also require mechanical energy to be operated; if, as given for the low temperature Stirling engine, this energy at low rotational speed and high torque is available around the clock, they can be directly connected to the engine via conveyor belts or similar meanings, making thus obsolete the necessity of electric driving motors.

An specially and advantageous embodiment of the invention is described hereafter:

A Stirling engine comprising at least one cylinder with an expansion chamber and a compression chamber, a power piston and a displacement piston that are located in the at least one cylinder, at least one regenerator connecting the expansion chamber and a compression chamber, at least one crankshaft connecting the at least one piston to at least one flywheel, a working medium in the expansion chamber, the compression chamber and the regenerator, at least one heat exchanger, at least one heat sink, and at least two membranes wherein the membranes are polymer-based membranes connecting the power piston and the displacement piston to the at least one cylinder, and wherein the cylinder is to be understood functional, i.e. as a space with a surrounding wall (i.e. it does not have to be a cylindrical shape in the sense of geometry).

It is preferred that at least of the membrane is a double layer membrane, preferably an inflated double layer membrane, that connects the power piston to the cylinder, preferably where the inflation is maintained by a flexible tube connecting the working gas room via a one way valve.

Furthermore it is preferred that the membrane comprises halogenated olefin based polymer material.

Moreover the displacer piston may connected to the expansion chamber with a displacer piston membrane.

Preferably, the displacer piston membrane is thermally insulated, i.e. comprising a thermal insulation barrier layer with a heat conductivity that is lower than the heat conductivity of a surface material of the membrane.

Preferably, the heat exchanger is located adjacent to the regenerator on the side facing the expansion chamber and the heat sink is located adjacent to the regenerator on the side facing the compression chamber.

A Method of using a Stirling engine, wherein the Stirling engine comprises at least one cylinder with an expansion chamber and a compression chamber, wherein at least one power and/or displacement piston moves in the at least one cylinder, wherein a working medium moves through at least one regenerator that connects an expansion chamber and a compression chamber, wherein at least one crankshaft connects the at least one piston to the at least one flywheel, wherein at least one heat exchanger heats the working medium in the expansion chamber, wherein at least one heat sink cools the working medium in the compression chamber, and wherein at least two polymer-based membranes provide an gastight seal by connecting the power and the displacement piston to the at least one cylinder.

Preferably, the flywheel is used to drive a first hydraulic water piston.

Preferably, the pressure fluctuations produced by the hydraulic water piston are used to drive a submersible hydraulic second water piston, pumping the water by a device formed of two one way valves, a return spring, a raiser pipe and an air/water pressure homogenizer.

Both, the engine and the method could be further developed, if an excenter pin connected to the first hydraulic pump can be mechanically moved and fixed in any position between the center of rotation of the flywheel in order to adapt the pump to any desired well depth.

It is advantageous too, if the excenter pin driving the displacer piston rod can be continuously shifted from the center of rotation to the periphery of the related gear wheel, in order to regulate the engine power.

Preferably, two engines are coupled in the way, that one acts as thermal prime mover and drives the second, operating inversely as cooling engine or heat pump.

Preferably, the reversibly operating Stirling is driven by external energy.

Preferably, the external energy source is a photovoltaic panel and the Stirling cooler produces ice for storage.

Alternatively, the prime mover acts as tri-generation system in combination with solar thermal collectors and adequate heat storages.

Preferably, the low speed, high torque output of the flywheel is directly mechanically connected to different subsystems as compressor, mills, saws a.s.o.

OVERVIEW OF THE FIGURES

FIGS. 1-1a are a representation of a low temperature Stirling engine according to one aspect of the present invention. Individually, FIG. 1 represents a schematic cross section of the low temperature Stirling engine according to the invention. FIG. 1a is an additional view of a low temperature Stirling engine according to one aspect of the present invention.

FIG. 2 is a graphical representation of a low temperature Stirling engine as around the clock operating solar water pump according to one aspect of the present invention.

Figure 6:
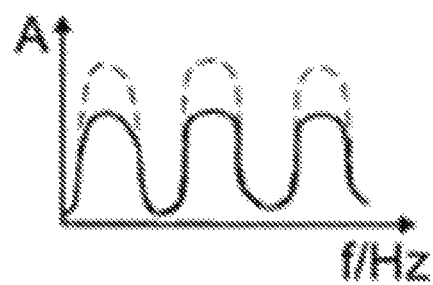

FIG. 6 (centrally presented on the "FIG. 2" page) schematically represents the power output in different pressure environments.

Figure 7:
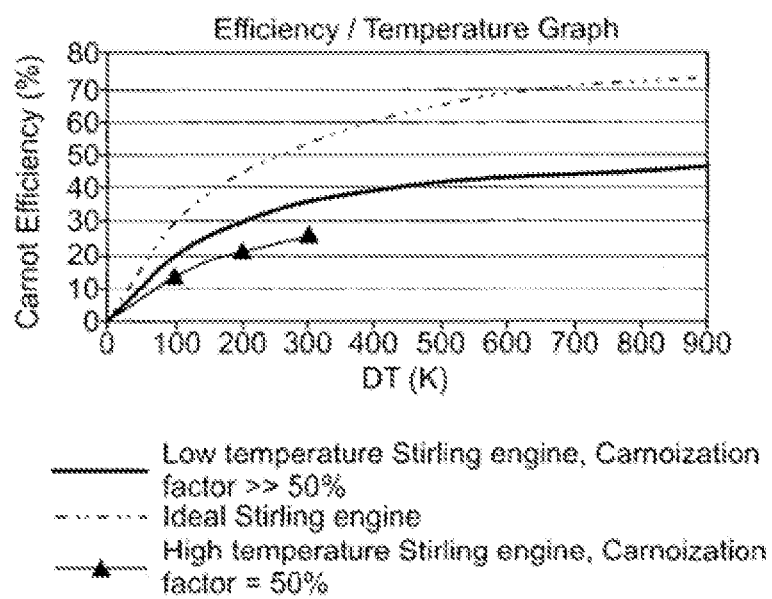

FIG. 7 is a representation of efficiencies in function of the delta temperature between hot gas and cold gas.

Figure 8:
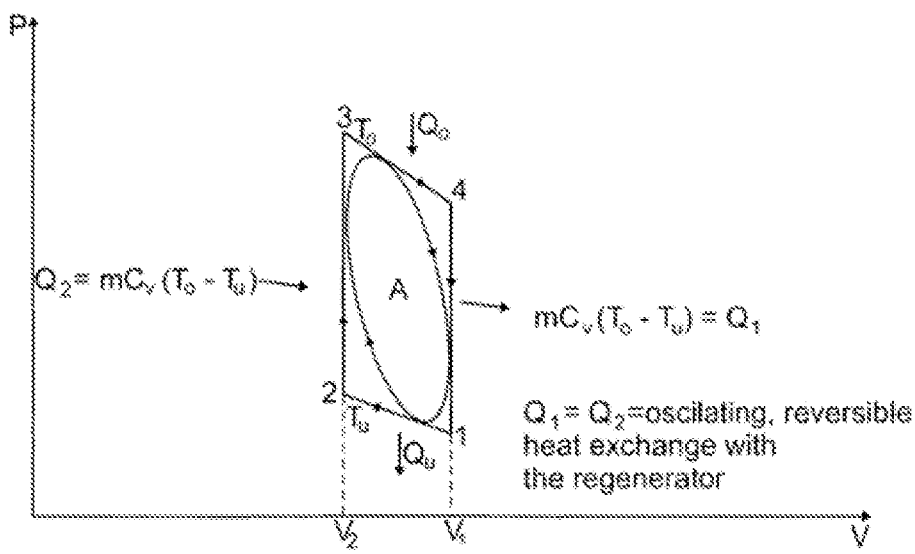

FIG. 8 is a Volume-Pressure representation the phases of a typical Stirling engine.

DETAILED DESCRIPTION OF THE FIGURES

Figure 1:
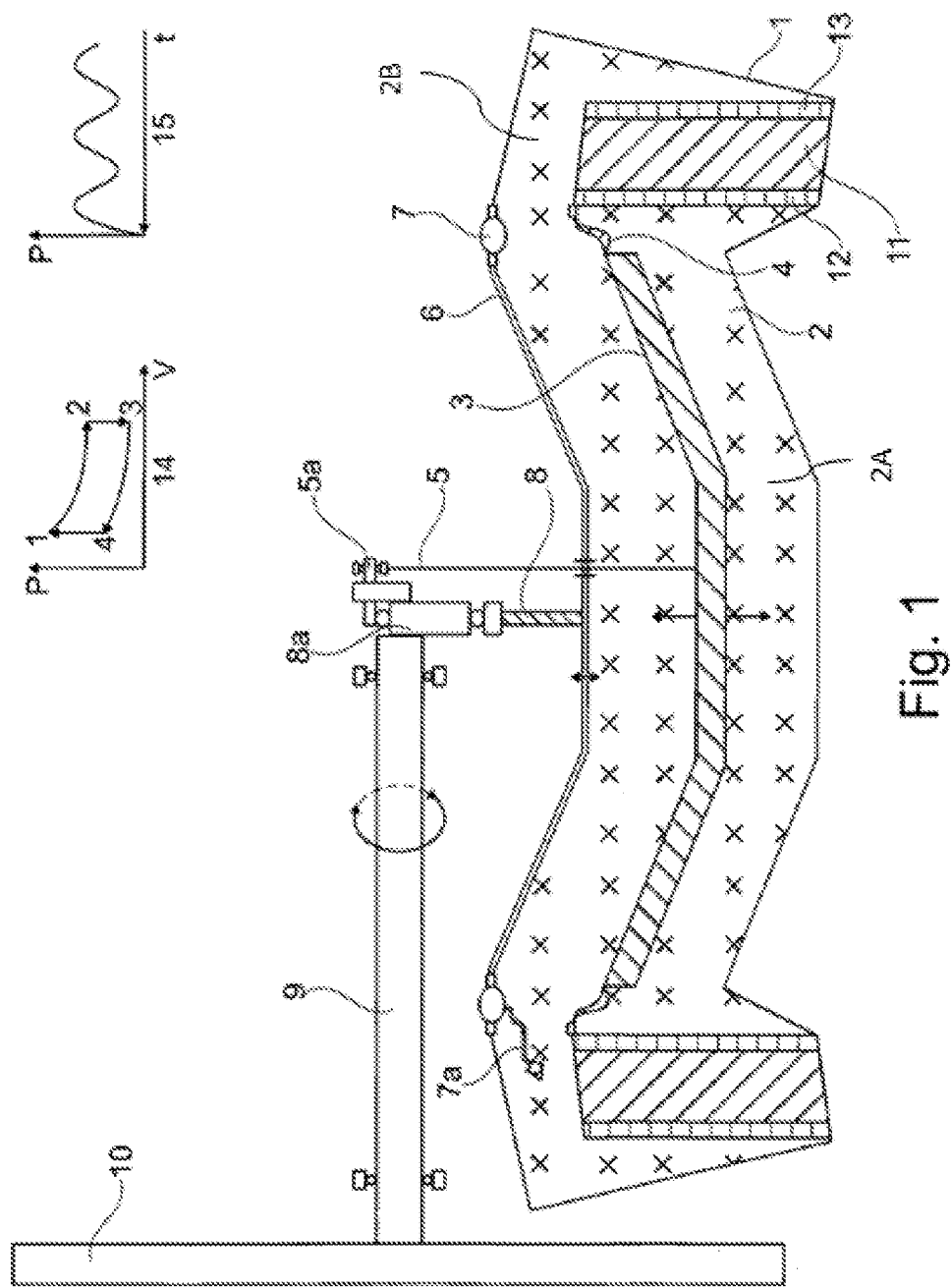

FIG. 1 represents a schematic cross section of the low temperature Stirling engine according to the invention. Cylindrical housing (1) containing the hermetically enclosed working medium (2), symbolized by (XXX). (3) is the circular displacer piston, attached to the cylindrical hot side heat exchanger by a double sheet, flexible polymer membrane (4). The displacer piston (3) is thermally insulating; as well as the membrane (4) which is filled between the two layers with flexible insulation material (foam, fibers).

The displacer piston oscillates vertically in the space of the working medium (preferably a gas), driven by a rod (5) connected to the displacer excenter (5a). The displacer piston (3) separates hermetically the working medium room (2) into the hot expansion room (2a) and the cold compression room (2b).

The displacer piston (3) shifts periodically the working medium through the cylindrical heater respectively heat exchanger (12), regenerator (11), cooler respectively heat sink (13) assembly and vice versa. By this way, the working medium is periodically heated and cooled and consequently creates a sinusoidal pressure fluctuation, as represented in (15) and moving through four steps as represented in volume-pressure diagram (14). These pressure fluctuations act on the power piston (6) which closes the cylindrical Stirling housing (1) toward the top. The power piston (6) is connected hermetically toward the housing (1) by an air inflated, flexible double membrane (7). This double membrane can be either completely air tight or, connected to a flexible tube with one way valve (7a) ending in the cold working medium room (2b). The pressure fluctuation (15) in this room fills periodically the double membrane (7) with the peak pressure of the cycle, thus compensating for eventual leakages of the double membrane.

The power piston (6) extracts the cycle energy produced thermodynamically by the working medium (2) into mechanical energy. Its oscillating movement is transmitted by the power piston rod (8) to the power piston excenter (8a). This excenter is transforming the lateral oscillation of the power piston (6) into the rotational movement of the axes (9) connected to the flywheel (10).

The crank mechanism represented by (8), (8a), (5) and (5a) coordinates the movement of the displacer piston (3) versus the power piston (6) in function of the time. This way, the thermodynamical Stirling cycle (two isothermal and two isochoric process steps), as more detailed described above is realized.

Figure 1A:
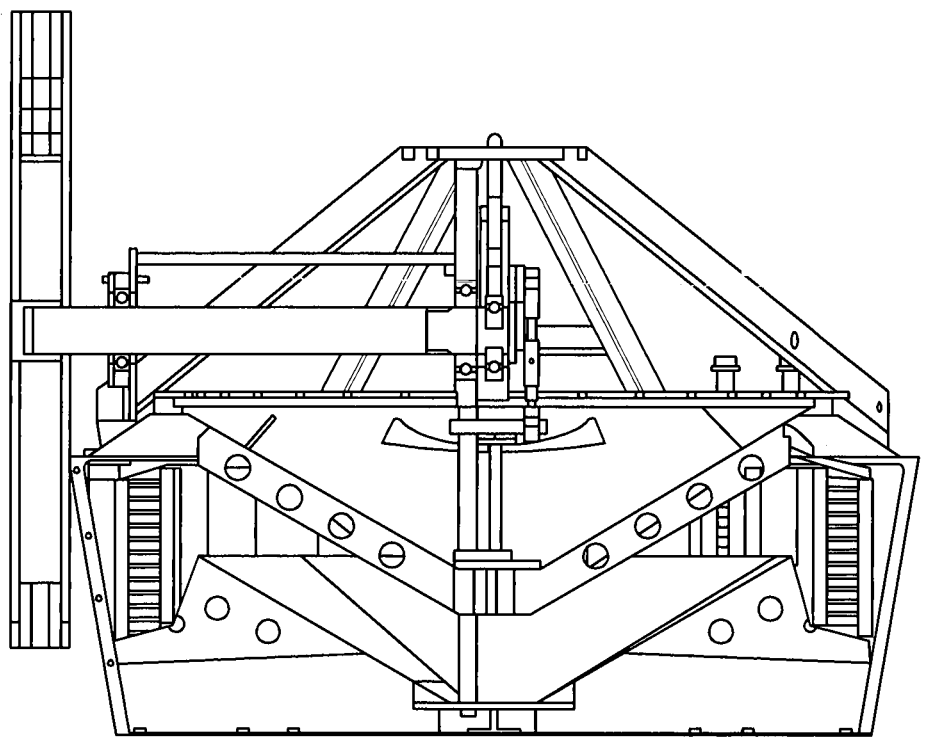

The present invention for instance exemplified in FIG. 1 and the additional view of the Stirling engine in FIG. 1a represents the simplest realization of the Stirling engine—an engine working with air at ambient pressure.

The large dimensions allow, as mentioned for large surfaces of the heater-regenerator-cooler (12, 11, 13) unit, with the explained positive effects for the engines efficiency.

The slightly conical design of the cylinder (1) makes also possible another feature of the present invention: as the cooler (13) forms the outer cylinder of the unit (12, 11, 13), the Stirling engine must not be thermally insulated from the ambient. This topology advantage against classical Stirling engines represents a significant simplification and a gain of economy.

The large heat exchanger surfaces in combination with the low frequencies allow to use atmospheric air as working medium. This is another important advantage against high temperature engines needing hydrogen or helium.

In FIG. 2 typical application of the present invention is represented. It shows the low temperature Stirling engine as around the clock operating solar water pump. (26) represents the mentioned solar collector field, producing thermal heat of 150° C. with 50% efficiency and storing it for night time operation within the storage tank (25). The hot fluid of the tank flows through the hot-side heat exchanger (12) of the low temperature Stirling engine. A smaller part of the water pumped out of the borehole flows through the cooler (13) and from there via pipe (13a) to the "customer" (24a). The flywheel with high torque and moderate rotational speed actions a first water hydraulic cylinder (16) mounted to an eccentric pin (16a) and a rotating fix point (17).

The periodically pressurized water in the first water hydraulic cylinder is transported via a thin steel tube (18) into a second, submersed water hydraulic working cylinder (19) at the ground of the borehole. This second water hydraulic cylinder oscillates in coherence with the working frequency of the engine connected working cylinder (16). The second water hydraulic cylinder (19) acts toward a valves and spring cylinder (20a) containing to one way valves (20, 22) and a spring (21). At its movement toward the inner dead point, cylinder (19) opens valve (20) and valves and spring cylinder (20a) fills with water. When moving upward, the second water hydraulic cylinder (19) closes valve (20) and opens valve (22); consequently the water is pushed through the riser tube (23), to the surface.

Before flowing in the "customer" reservoir (24a), the pumped water is pushed into a water/air reservoir (24).

(24) changes the pulsating water flow into a regular one. Spring (21) brings back the hydraulic pump to its initial stage after each working pulse.

FIG. 2 further represents a water/depth delivery graph which shows the excellent pumping capacity of an atmospherically working low temperature Stirling engine with 400 W mechanical power output and showing the flow rate as a function of pumping depth at 400 W hydraulic power with the head (in meters) on the X-axis and the flow rate (in liters/minute) on the Y-axis.

Figure 3:
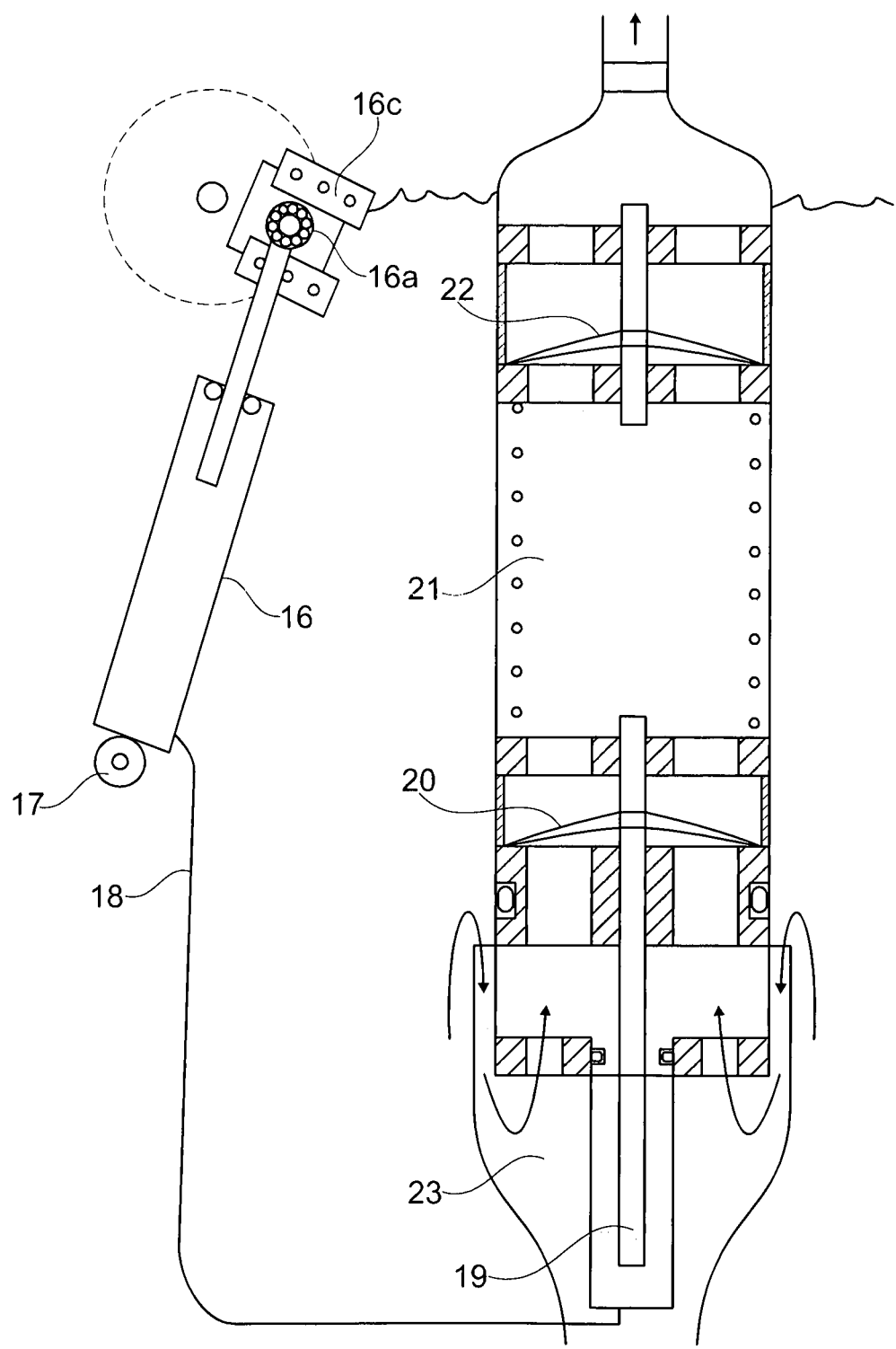
FIG. 3 is a graphical representation of flywheel with adjustable eccentric pin according to one aspect of the present invention.

In FIG. 3 it is schematically represented, how the eccentric pin (16a) on which the hydraulic cylinder (16) is mounted, can be moved by a sliding mechanism (16b) in any position between the center of rotation of the flywheel (16c) and the outer diameter of the flywheel (16d). This means, that according to the water/depth delivery graph in FIG. 2 the related piston stroke related to a given borehole depth can be adjusted, so that the low temperature Stirling engine pump always works at its best operational point.

Figure 4:
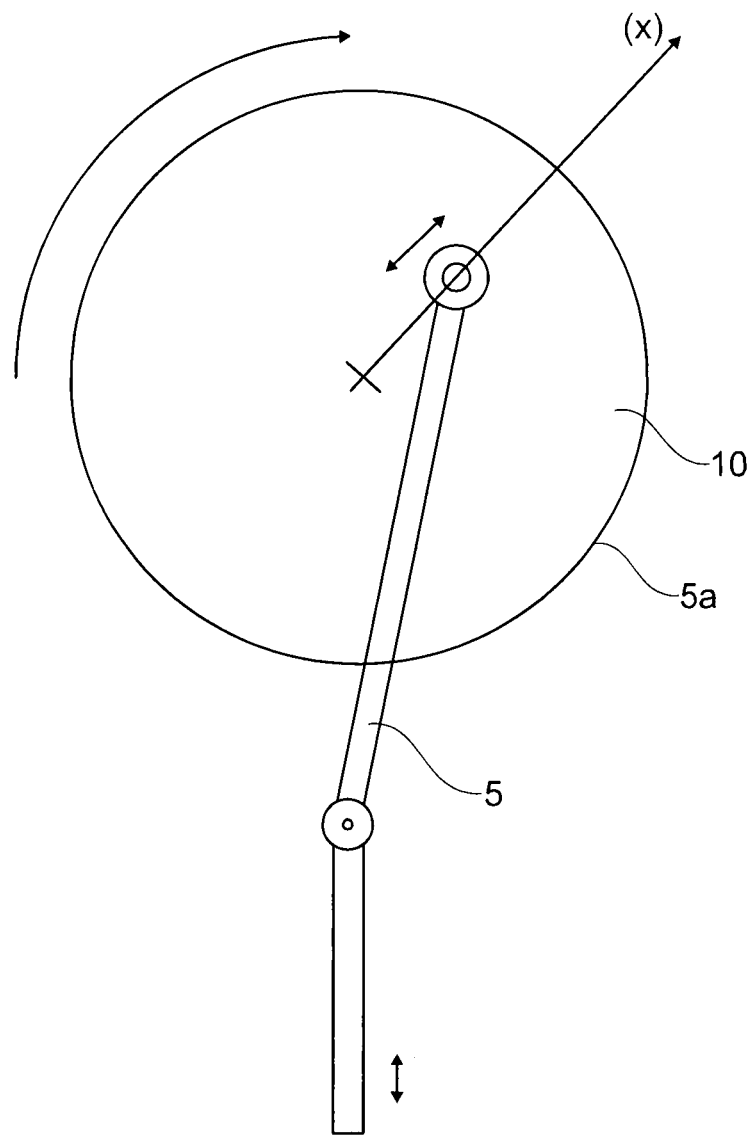
FIG. 4 is a graphical representation of flywheel with power regulation according to one aspect of the present invention.

Another important feature of the present invention is schematically shown in FIG. 4. It deals with the power regulation of the low temperature Stirling engine. It is executed in a similar way as already described for the regulation of the hydraulic water pump. In this case, the excenter pin (5a), moving backward and forward the displacer rod (5), can be continuously moved from the center of the rotation to the outer perimeter along the diameter of the rotating crank disk; consequently the displacer amplitude, which is in direct correlation with the delivered engine power, can be continuously changed from zero stroke (power) to maximum stroke (power). This can be either controlled manually by fixing the pin in a given position, or by moving the pin continuously and during the engine operation by an hydraulically or electrically operated linear actuator.

Figure 5:
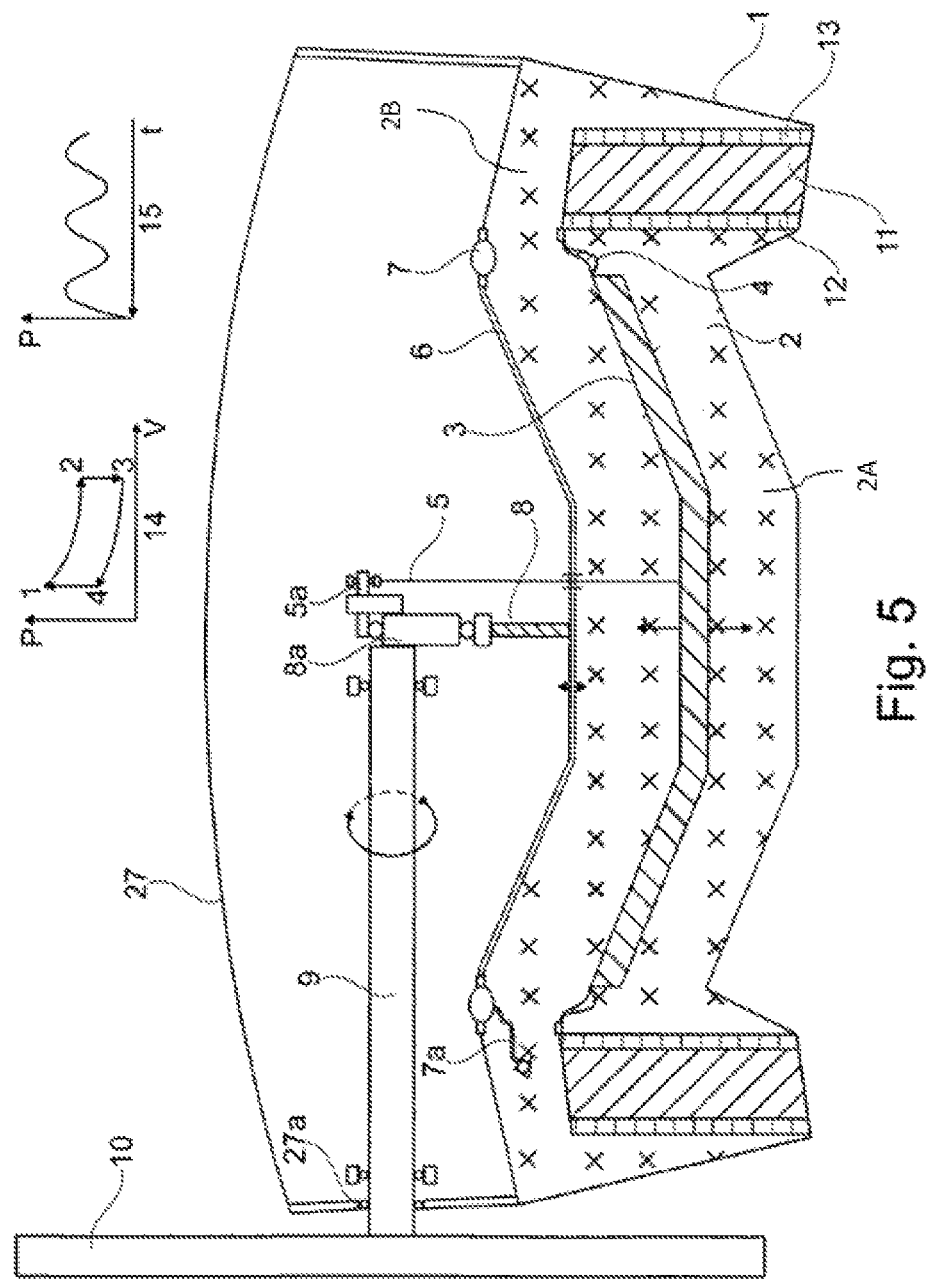
FIG. 5 is a graphical representation of a Stirling engine with a domelike cylindrical cover according to one aspect of the present invention.

FIG. 5 presents a domelike cylindrical cover (27) with a rotational bearing around the axis (9). Such set up allows, without loosing the design guidelines of relative low frequencies and large heat exchange and regenerator surfaces, to fill the atmospheric low temperature Stirling engine with slightly compressed air, typically up to 5 bars.

The power output of pressurized engines is augmenting practically linearly with the absolute pressure, as long as the relation between power output and heat exchanger surface stays favorable. We found that this is the case up to 5 bars pressure.

The higher power output results from the larger pressure fluctuations of the working medium, as schematically shown in FIG. 6 (under (12) on the page of FIG. 2).

Therefore, slightly pressurized low temperature Stirling engines bear the possibility to reduce the necessary volume and therefore amount of necessary material in a well defined range.

The same holds true for a slight enhancement of the working frequency, up to 4 Hz.

FIG. 1 shows a cross section of a realized atmospheric low temperature Stirling engine. With a diameter of 1 m, a height of 0.4 m and a frequency of 1.5 Hz it delivers 0.5 kW shaft power.

If, as for instance principally described for FIG. 6, as an example this engine is pressurized to 4 bars, it will deliver approximately 2 kW. By further enhancing the working frequency to 3 Hz, it will deliver approx. 4 kW.

FIG. 7 shows the efficiencies in function of the delta Temperature between the hot gas and the cold gas with the delta Temperature (in Kelvin) on the X-axis and the Carnot efficiency (nn %) on the Y-axis.

The solid line represents the low temperature Stirling engine. Carnoization factor >>50%. The dotted line represents the ideal Stirling engine. The solid line with triangle represents the high temperature Stirling engine with Carnoization factor of 50%.

FIG. 8 represents the ideal Stirling cycle (Volume versus Pressure) with 4 steps wherein Q1=Q2=oscillating, reversible heat exchange with the regenerator.

LIST OF REFERENCE NUMERALS USED 1 cylinder respectively cylindrical housing respectively cylindrical stirling housing
2 working medium respectively working medium room
2A expansion chamber
2B compression chamber
3 displacement piston
4 displacer piston membrane
5 rod respectively displacer rod
5A displacer excenter
6 power piston
7 power piston membrane
7A one way valve
8 power piston rod
8A power piston excenter
9 axes
10 flywheel
11 regenerator
12 heat exchanger respectively cylindrical heater
13 heat sink respectively cooler
13A pipe
14 volume-pressure diagram
15 pressure-fluctuation diagram
16 first water hydraulic cylinder
16A eccentric pin
16B sliding mechanism
16C flywheel
16D flywheel
17 rotation fix point
18 thin steel tube
19 second, submersed water hydraulic working cylinder
20 one way valve
20A spring cylinder
21 spring
22 one way valve
23 riser tube
24 water/air reservoir
24A customer reservoir
25 storage tank
26 solar collector field
27 cylindrical cover respectively airtight cover

The invention claimed is:

1. A Stirling engine comprising at least one cylinder with an expansion chamber and a compression chamber, and a power piston and a displacement piston that are located in the at least one cylinder; wherein the at least one cylinder further comprises at least one regenerator connecting the expansion chamber and the compression chamber; wherein the at least one cylinder comprises at least one heat exchanger, and at least one heat sink; and wherein a working medium is present in the expansion chamber, the compression chamber and the at least one regenerator, characterized in that the engine comprises at least one membrane that connects at least one of the pistons to the at least one cylinder, wherein the compression chamber at least in part surrounds cylindrically the expansion chamber of a working cylinder of the at least one cylinder.

2. The Stirling engine according to claim 1, wherein one end of the at least one membrane is fixed in place at least one of the pistons, and wherein another end of the at least one membrane is fixed in place at the at least one cylinder.

3. The Stirling engine according to claim 1, wherein the power piston is connected to the at least one cylinder (1) with a power piston membrane as one of the at least one membrane.

4. The Stirling engine according to claim 3, wherein the power piston membrane is inflated.

5. The Stirling engine according to claim 3 or 4, wherein one end of the power piston membrane is fixed in place at the power piston and an other end of the power piston membrane is fixed in place at a cylindrical housing.

6. The Stirling engine according to claim 1, wherein the displacement piston is connected to a cylindrical heater as the at least one heat exchanger of the expansion chamber of the at least one cylinder with a displacer piston membrane as one of the at least one membrane.

7. The Stirling engine according to claim 6, wherein the displacer piston membrane is thermally insulated.

8. The Stirling engine according to claim 6 or 7, wherein one end of the displacer piston membrane is fixed in place at the displacement piston and another end of the displacer piston membrane is fixed in place at the cylindrical heater.

9. The Stirling engine according to claim 1, wherein the at least one membrane is polymer-based, and/or the at least one membrane is a double layer membrane, and/or the at least one membrane comprises halogenated olefin based polymer material.

10. The Stirling engine according to claim 1, wherein the at least one heat exchanger is located adjacent to the at least one regenerator on the side facing the expansion chamber and the at least one heat sink is located adjacent to the at least one regenerator on the side facing the compression chamber.

11. The Stirling engine according to claim 1, wherein the compression chamber at least in part surrounds cylindrically the at least one regenerator.

12. The Stirling engine according to claim 1, characterized in that the at least one membrane is polymer-based and is connected to at least one of the pistons and to the at least one cylinder and wherein the connection is gastight.

13. The Stirling engine according to claim 1, characterized in that the engine is connected to a flywheel that is connected to a first hydraulic water piston.

14. The Stirling engine according to claim 1, characterized in that the engine is placed in an airtight cover that is pressurized higher than 1.5 bar and up to 5 bar.

15. The Stirling engine according to claim 14, the engine further comprising an axis that is connected to a flywheel, wherein the airtight cover has rotational bearings around the axis.

16. The Stirling engine according to claim 1, characterized in that the diameter of the at least one power piston is at least 10 times larger than a vertical displacement of the power piston.

17. A method of using at least one membrane to connect at least one piston to at least one cylinder with an expansion chamber and a compression chamber of a Stirling machine, wherein the Stirling machine further comprises a power piston and a displacement piston that are located in the at least one cylinder; wherein the at least one cylinder further comprises at least one regenerator connecting the expansion chamber and the compression chamber; wherein the at least one cylinder comprises at least one heat exchanger, and at least one heat sink; and wherein a working medium is present in the expansion chamber, the compression chamber and the at least one regenerator, wherein the at least one membrane is a polymer-based multiple-layered membrane that is gas inflated wherein the connection is gastight and wherein the compression chamber (2B) at least in part surrounds cylindrically the expansion chamber (2A) of a working cylinder of the at least one cylinder.

* * * * *